W. A. BONNELL.
COMBINED CONDUIT CLAMP AND KNOCK OUT DISK.
APPLICATION FILED NOV. 21, 1908.
921,585.
Patented May 11, 1909.
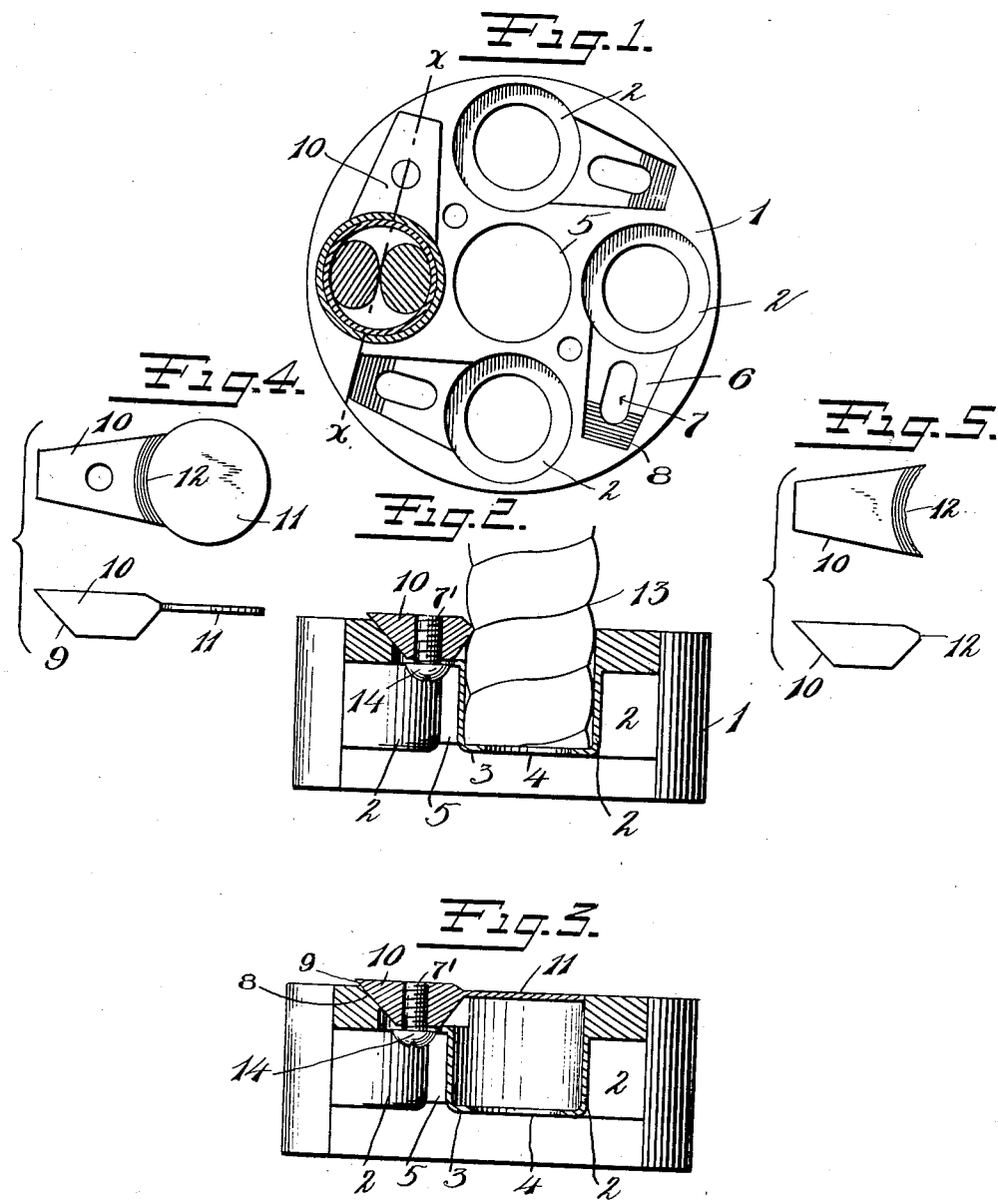

UNITED STATES PATENT OFFICE.

WILLIAM A. BONNELL, OF NEW YORK, N. Y., ASSIGNOR TO HATTIE W. BONNELL, OF BROOKLYN, NEW YORK.

COMBINED CONDUIT-CLAMP AND KNOCK-OUT DISK.

No. 921,585.           Specification of Letters Patent.           Patented May 11, 1909.

Application filed November 21, 1908. Serial No. 463,773.

*To all whom it may concern:*

Be it known that I, WILLIAM A. BONNELL, a citizen of the United States, residing at the city of New York, county and State of New York, have invented certain new and useful Improvements in a Combined Conduit-Clamp and Knock-Out Disk, of which the following is a full, clear, and exact description.

My invention relates to improvements in outlet boxes for electric conduits and has for its object the provision of a simple form of clamping plate and so-called knock-out disk, which will be economical to manufacture and will save time in the assembling of the box, clamp and disk.

In constructions of this character heretofore employed, it has been the common practice to make the clamping plate for holding the conduits in place in the box, and the knock-out disks which are intended to close such of the conduit openings or sockets not in use, in separate parts. Such construction involves the separate molding of the plates and disks and also the assembling of two parts upon the box instead of one. To obviate these objections, I form the clamping plate and knock-out disk in one piece whereby said parts may be assembled upon the box in one operation, and a further advantage resulting from this construction is that when the knock-out disk is broken out, the roughened edge or lip left thereby upon the edge of the clamping disk forms a gripping edge or face to securely engage the conduit.

With these objects in view, my invention consists in the construction and arrangement of parts a preferred embodiment of which is illustrated in the accompanying drawings, in which, Figure 1 is a plan view of the rear side of an outlet box, showing a conduit clamped in one of the sockets thereof. Fig. 2 is a sectional view on the line x—x Fig. 1. Fig. 3 is a view similar to Fig. 2, showing the combined clamping plate or knock-out disk in position closing one of the conduit sockets. Fig. 4 comprises a plan and edge view of the combined clamping plate and knock-out disk, and, Fig. 5 is a view similar to Fig. 4, showing the clamping plate after the knock-out disk has been broken off.

In the embodiment of my invention herein selected for illustration, 1 indicates an outlet box of usual circular construction and having arranged around its perimeter a plurality (here, four) of conduit receiving sockets or bushings 2, which, as shown in Figs. 2 and 3, project into the interior of the box and are provided with lips or flanges 3, upon which the end of the conduit rests when in position, while an aperture 4 at the bottom of each bushing permits the passage of the electric cables or wires. The box is further provided with a central sleeve or bushing 5 through which the gas pipe, to which the outlet box is to be attached, passes. The box may be secured to the pipe in any desired manner as by a set screw in said sleeve.

Adjacent each conduit bushing are arranged clamping plate receiving depressions 6, having slots 7 at the bottom for the passage of the clamping screw 7', which serves to move the clamping plates to holding position against the conduits. The rear surface 8 of each clamping-plate receiving depression is inclined to co-act with corresponding inclined surfaces 9, upon the rear ends of the clamping plates 10, whereby said plates will be moved to clamping position when the screws are tightened up.

Each of the clamping plates 10 has formed integral therewith at its forward end a knock-out disk 11 which is made comparatively thin, so that it may be readily broken out. As illustrated in Fig. 3, the clamping plate when in position adjacent an empty bushing serves with its integral disk 11 to close said bushing. When it is desired to insert a conduit in one of the bushings, it is only necessary to break out the knock-out disk, closing the same, thus leaving a free passage for the conduit. When the disk is so broken out, the line of cleavage thereof with the corresponding clamping plate leaves a roughened edge 12 on said plate which is adapted to securely engage the conduit. The junction between the plate and disk furthermore is formed on a curve of approximately the radius of the conduit to be clamped whereby the broken edge 12 when the plate is in position against the conduit, will serve to embrace the latter, and inasmuch as the conduit is usually formed of one or more spirally wound strips of metal, said edge 12 will at some point engage within the spiral groove 13, Fig. 2, of said conduit, and thereby hold the same securely from withdrawal from its bushing. The heads 14 of the clamping screws 7', by which the clamping plates are secured within their depressions, are located in the interior of the box, so that they may be readily reached by a screw driver when the box is secured in position. By reason of the fact that the clamping plates are located above the rear surface of the box, and only the heads of the clamping screws project within the interior thereof, ample room is afforded within the interior of the box for manipulation of the electric cables or wires. A further advantage of forming knock-out disks integral with the clamping plate lies in the fact that when said disks are broken away a raw edge of metal is left which when in contact with the conduit, serves effectively to "ground" the same, which is a highly desirable feature in devices of this character.

While I have herein shown a particular embodiment of my invention, it is to be understood that the same may be altered in detail and relative arrangement of parts without departing from the spirit or scope thereof.

What I claim is:

1. In a device of the character described, a clamping plate having an inclined rear wall and having a knock-out disk formed integral therewith at its forward end and so arranged that when said disk is broken away, a roughened edge of raw metal will be left at the line of cleavage.

2. In a device of the character described, a clamping plate having an inclined forward end and having a knock-out disk formed integral with said end at the clamping edge of said plate.

3. In a device of the character described, a clamping plate having an inclined forward end and having a knock-out disk formed integral therewith at said end and slightly below the outer surface of said plate and so arranged that when severed from said plate, a roughened edge of raw material will be left to form the conduit-engaging edge of said plate.

4. In a device of the character described, a clamping plate having its forward end of reduced thickness and having a knock-out disk formed integral with said end and so arranged that when said disk is broken away a roughened edge of raw metal will be left at the line of cleavage forming a clamping edge for said plate.

WILLIAM A. BONNELL.

Witnesses:
R. W. PAWELL,
CHAS A. PEARD.